US006489748B1

(12) United States Patent
Okamura (10) Patent No.: US 6,489,748 B1
(45) Date of Patent: Dec. 3, 2002

(54) SPLIT BACKPLANE POWER SYSTEM (75) Inventor: Katsuhiro Okamura, Watsonville, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/728,673

(22) Filed: Dec. 1, 2000

(51) Int. Cl.$^7$ ............................... H02J 7/00; H02H 3/14
(52) U.S. Cl. ......................................... 320/116; 361/88
(58) Field of Search ........................... 320/116; 307/84, 307/87; 713/300; 361/88

(56) References Cited

U.S. PATENT DOCUMENTS

| | | | | | |
|---|---|---|---|---|---|
| 4,967,097 A | * | 10/1990 | Mehl | ............................ | 307/84 |
| 6,184,655 B1 | * | 2/2001 | Malackowski | ............... | 320/116 |
| 6,222,708 B1 | * | 4/2001 | Severson et al. | ............... | 361/2 |
| 6,317,012 B1 | * | 11/2001 | Coffey | ...................... | 333/24 R |

* cited by examiner

Primary Examiner—Edward H. Tso
Assistant Examiner—Pia Tibbits

(74) Attorney, Agent, or Firm—Blakely, Sokoloff, Taylor & Zafman LLP (57) ABSTRACT A system and method for providing power to a set of logic cards that enables approximately twice as much power to be supplied to the logic cards than would normally be available using conventional power supply systems and methods. The system includes a system backplane having a split power plane, wherein each half of the split power plane receives power from a separate power supply circuit. Preferably, the power supply circuits comprise circuit portions of a power entry module (PEM), which typically is connected to a pair of service points provided by a DC or an AC power source. The PEM and system backplane include circuitry to enable a single backplane to be powered by two separate power supplies, thereby providing the system backplane and the set of logic cards with approximately twice as much power than could normally be provided by a single service point. To facilitate this capability, the PEM includes circuitry for detecting the power supplied by each of its power supply circuits and for automatically shutting down power supply to the system backplane in the event of a detected failure condition, such as an undervoltage condition on one or both of the power supplies, and a voltage differential between the power supplies that exceeds a predetermined threshold. The system and method also provides for the use of a second PEM that is used in situations requiring a redundant power supply system.

34 Claims, 6 Drawing Sheets

SPLIT BACKPLANE POWER SYSTEM

FIELD OF THE INVENTION

The present invention generally pertains to the field of power supplies, and more particularly concerns a power system that supplies power to a system backplane having a split power plane.

BACKGROUND OF THE INVENTION

In telecommunications (telco) environments, it is important that the various switching systems used to transfer calls and data across communication networks be provided with a constant power supply, regardless of external conditions, such as power failures. As a result, many telecommunications (telco) environments provide battery power sources rather than AC power sources, although AC power sources may be used to provide a DC supply to the telco equipment with a battery backup for emergency situations.

Because many telco companies have been in operations for decades, the power provided at various power distribution panels within their facilities were often designed and built many years ago, when much of the telco switching equipment required less power. For example, many telco environments provide a maximum of 60 A of current at their power distribution panels. As a result, the maximum power that can delivered to a switching device from the existing distribution panels is limited.

As an option, new switching equipment could be wired directly to a battery source and be physically located close to the battery source to meet the Bellcore power distribution requirements of the equipment. However, this leads to a very expensive and time-consuming installation, as it requires significant changes to the telco facility.

SUMMARY OF THE INVENTION

A system and method are described for supplying power to electronic systems, such as telco switching systems, in a manner that enables approximately twice as much power to be supplied to the electronic system than would normally be available using conventional power supply systems and methods. The power supply system includes a system backplane having a split power plane, wherein each half of the split power plane receives power from a separate power supply circuit. Preferably, the power supply circuits comprise circuit portions of a common power entry module (PEM), which typically will receive input power from a pair of service points provided by a DC such as a battery source or an AC/DC power conversion source. The PEM and system backplane include circuitry to enable a single backplane to be powered by two separate power supplies, thereby providing the system backplane and any connected logic cards with approximately twice as much power than could normally be provided by a single service point. To facilitate this capability, the PEM includes circuitry for detecting the power supplied by each of its power supply circuits and for automatically shutting down power supply to the system backplane in the event of a detected failure condition, such as an undervoltage condition on one or both of the power supplies, and a voltage differential between the power supplies that exceeds a predetermined threshold.

The system and method also provides for the use of a second PEM that is used in situations requiring a redundant power supply system. In this configurations, two power supply circuits, one from each PEM, are used to supply power to each half of the system backplane, thereby forming two sets of power supply circuits. This is facilitated, in part, by connecting each set of power supply circuits together in a diode ORed manner, whereby adequate power will be provided to a given half of the system backplane as long as at least one of the power supply circuits in particular set is operating normally.

Other features and advantages of the present invention will be apparent from the accompanying drawings and from the detailed description that follows below.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

A split-backplane power supply scheme is described that enables telco switching equipment that requires large amounts of power to be used with existing power distribution panels in telco facilities. The split-backplane scheme enables a single switching device/system to be supplied concurrently from multiple power sources, thereby lowering the amperage requirement for each of the power sources. In order to implement this strategy, various detection circuits are described to ensure that undesired power conditions do not occur at the split-backplane. For example, an undesired power condition occurs if power is supplied to only one-half of a split-backplane, while the other half does not receive power. Under this situation, the transceiver circuitry of logic cards connected to the backplane may be damaged.

Figure 1:
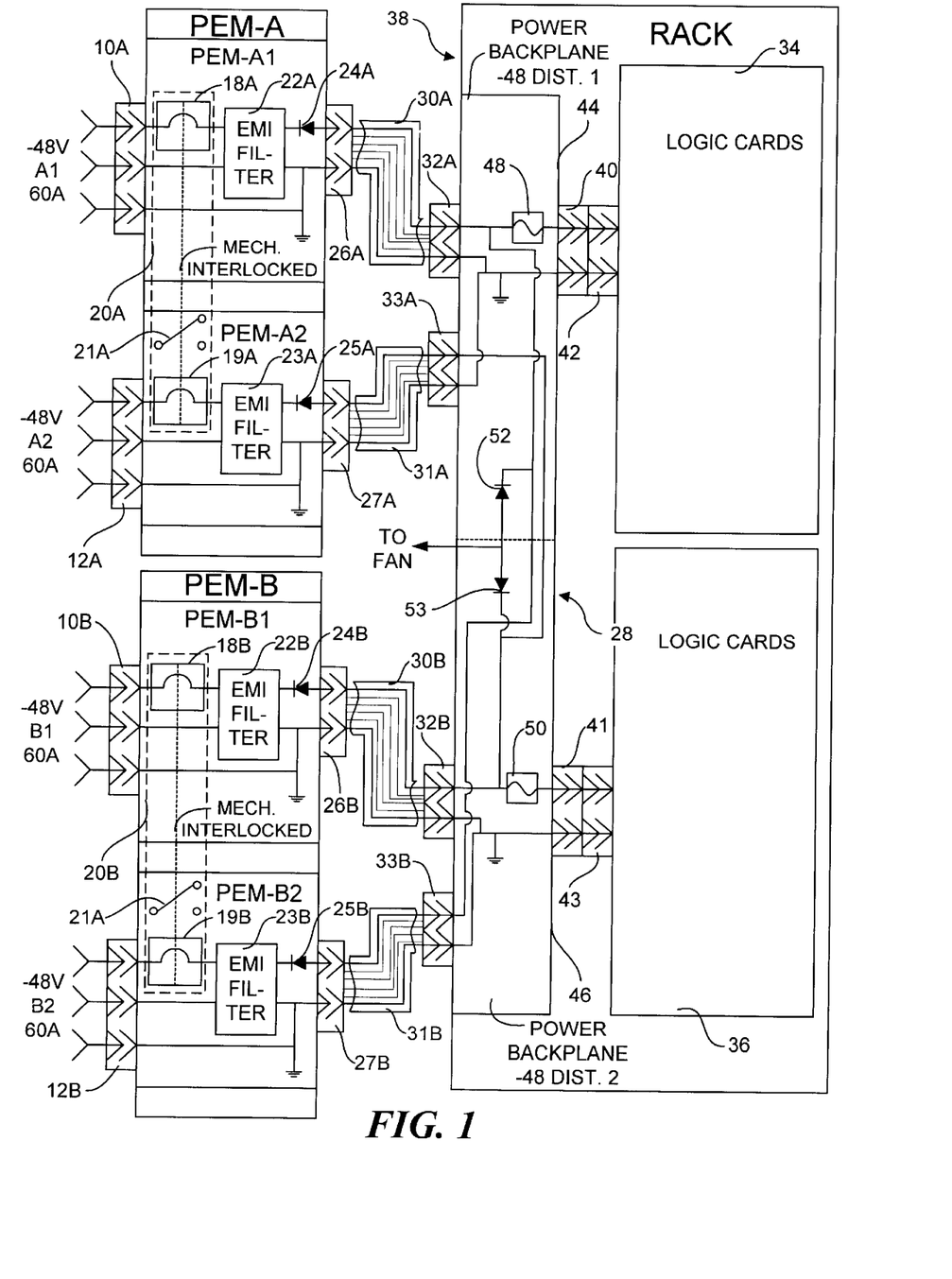
FIG. 1 is a schematic diagram illustrating an embodiment of the present invention in which two power entry modules (PEMS) are used to redundantly supply power to a single system backplane with a split power plane.

One embodiment of the invention is depicted in FIG. 1. In this configuration, power is provided from a set of redundant battery power sources "A" and "B." A single power source with multiple service points could be used, and the power sources could be batteries or other DC sources, such as AC-powered DC power supplies, as well as AC sources. Each service point provides up to 60 amps of current at −48 volts DC, corresponding to a current limit typically available at the distribution panels of many telco facilities.

Power from battery source A is received by a first DC power entry module (PEM), labeled "PEM A," through a pair of terminal blocks 10 and 12. Terminal blocks 10 and 12 preferably comprise 3-position, 75 amp rated terminal blocks. Similarly, power from battery source B is received by a second DC PEM labled "PEM B" through terminal blocks 14 and 16. Each PEM includes a pair of substantially identical power supply conditioning circuits, wherein the conditioning circuits for PEM A are labeled "PEM-A1" and "PEM-A2," and the conditioning circuits for PEM B are labeled "PEM-B1" and "PEM-B2."

The function provided by each of PEMS A and B is identical. Accordingly, the following will describe additional details of PEM A, which will be understood to also apply to PEM B, and the references corresponding to components of each of the PEMs is labeled with a suffix of "A" or "B" in FIG. 1, as appropriate. The −48 V from each of the entry points from power source A is routed to respective poles 18A and 19A of a double-pole 50 amp magnetic circuit breaker. The two poles on the circuit breaker are mechanically interlocked, forming an interlocked circuit breaker 21A. Each of the poles of interlocked circuit breaker 20A comprises a 50 amp series trip coil, while one of the poles includes an auxiliary switch 21A. The other pole has a remote voltage trip coil, similar to a relay trip coil, the operation of which is explained below. Auxiliary switch 21A is wired in series to the remote voltage coil so that the remote coil becomes de-energized once activated to trip.

The load side of each of circuit breaker poles 18A and 20A is connected to a respective EMI filter 22A and 23A, followed by respective "ORing" diodes 24A and 25A. The anode side of each of Oring diode 22A, 23A is connected to a respective "D-Sub" output connector 26A, 27A that provides output power to one-half side of a system backplane 28 via respective power cables 30A and 31A and connectors 32A and 33A. Preferably, each of connectors 26A, 27A, 32A and 33A provide multiple pins for power supply and signal feedback purposes, further details of which are provided below.

System backplane 28 supplies power to and couples signals to and from circuitry in sets of logic cards 34 and 36, which are contained within an electronic equipment rack 38, via backplane connectors 40 and 41, and card connectors 42 and 43. Logic cards 34 and 36 provide switching circuitry for performing telco switching functions. System blackplane 28 comprises a multilayer circuit board in which the power distribution routing is split into two halves, labled 44 and 46, while the signal routing for connecting the circuitry of logic cards 34 and 36 are contiguous across the backplane. In addition, system backplane 28 includes fuses 48 and 50 to protect logic cards 34 and 36 for overcurrent conditions, and each of the logic cards includes protection circuitry for similar purposes (not shown).

PEM A comprises a first power source, while PEM B comprises a redundant power source. Accordingly, power routing circuitry is included in system backplane 28 and the PEMs to enable concurrent operation of the redundant power sources. In particular, this circuitry includes a pair of diodes 52 and 53 in system backplane 28 and ORing diodes 24A, 24B, 25A and 25B in the PEMs. The ORing diodes enable power to be supplied from the redundant power sources, whereby if one of the power sources failed, the other power source will still provide adequate power to system backplane 28, and both PEMs A and B may be connected to system backplane 28 without affecting the operation of the other PEM. A single PEM can be used to supply power to system backplane 28 if redundancy is not required.

Figure 2:
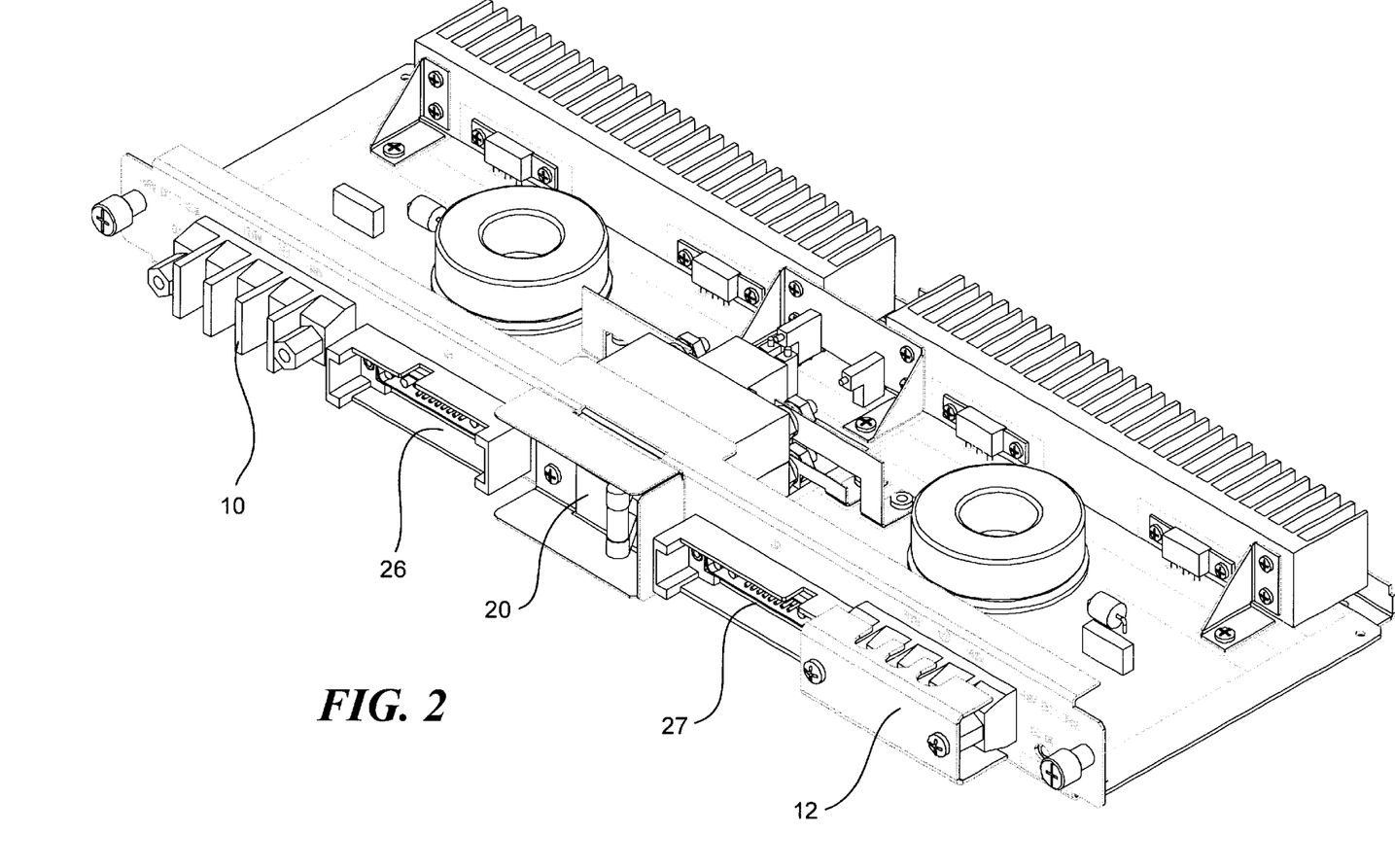
FIG. 2 is an isometric view of a PEM in accord with the PEMs of FIG. 1.

A detailed isometric drawing corresponding to an exemplary mechanical configuration of a PEM is shown in FIG. 2, with the suffixes of the reference numerals removed. Note that the mechanically interlocked circuit breaker 20 further includes an activation lever to enable someone to manual disable power from being delivered by the PEM.

There are various, problems associated with supplying a single backplane with power from multiple power sources. In the configuration of FIG. 1, a primary problem occurs if only one-half of the backplane is provided with power, while the other half is not. This scenario can occur, for example, if the battery feeds become inactive, power cables get disconnected, or one of the power planes fails in a shorted condition. The result of having power to only one half of the backplane is that the plug-in cards (e.g., cards 34 and 36) with power will be interfaced to the pluin cards without power via common connections on system backplane 28. This may cause damage to transceivers and the interface logic on the cards. In order to prevent such occurences, the PEMS are designed to detect when the have inadequate input supply power, or their power output falls below an accepted range, whereupon power to both planes of system backplane 28 is immediately removed.

Figure 3:
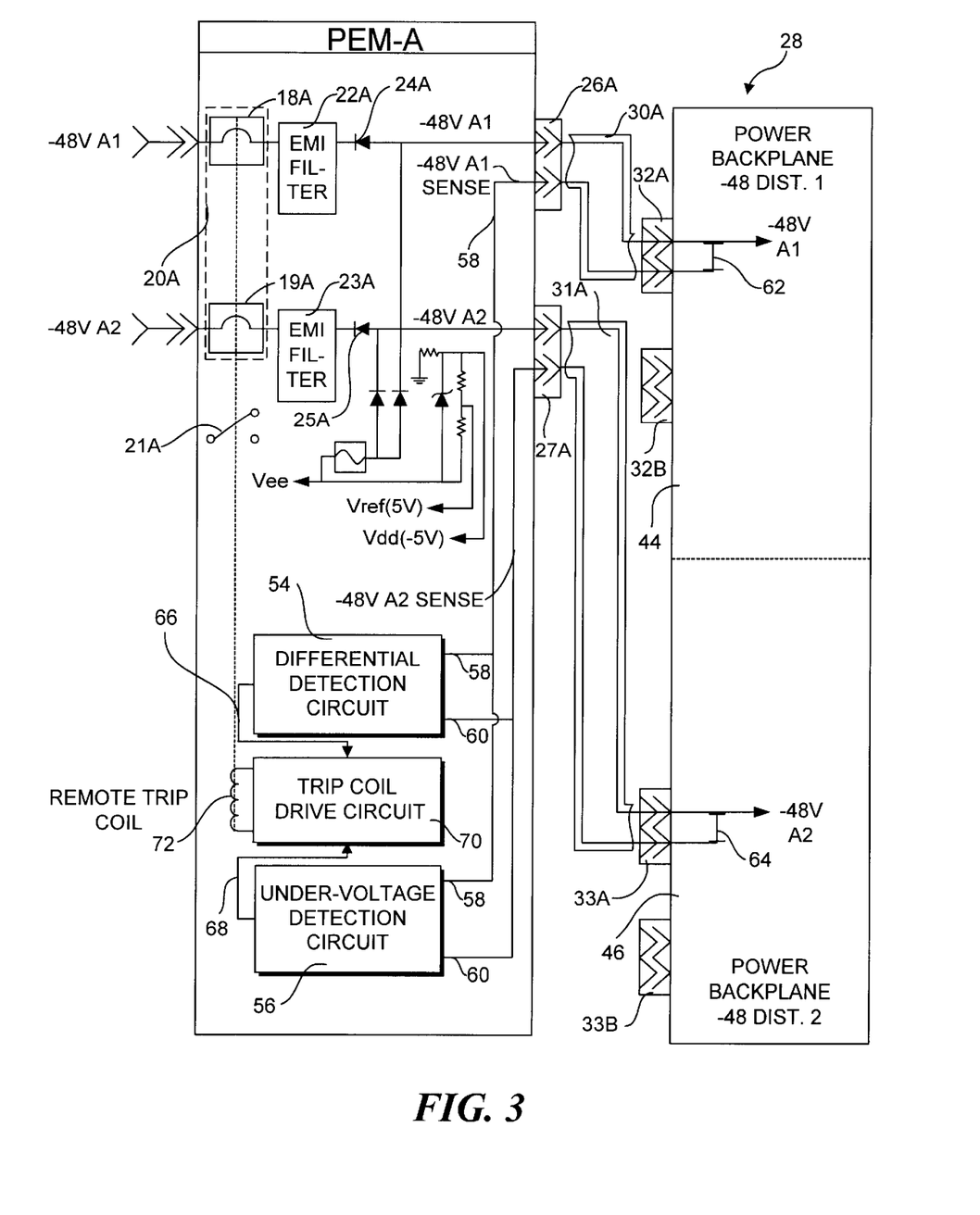
FIG. 3 is a schematic diagram of a PEM illustrating internal circuitry for detecting failure conditions and automatically shutting down power supply to the system backplane upon detection of such conditions.

To address these problems, PEMs A and B include circuitry to detect under-voltage and voltage differential conditions, whereby if either an under-voltage or differential condition is sensed, both PEMs are automatically shut down to remove power from system backplane 28. As shown in FIG. 3, these circuits are shown as a differential detection circuit 54 and an under-voltage detection circuit 56. Further details of both circuits 54 and 56 are described below.

Each of differential detection circuit 54 and under-voltage detection circuit 56 receives a pair of input signals comprising a −48 volt A1 sense signal 58 and a −48 volt A2 sense signal 60. −48 volt A1 sense signal 58 is connecteed on system backplane 28 via a jumper 62 to the −48 volt power input provided by battery service A1, while −48 volt A2 sense signal 60 is connected on the system backplane via a jumper 64 to the −48 volt power input provided by battery service A2. In addition, differential detection circuit 54 produces an output control signal 66 and under-voltage detection circuit 56 produces an output control signal 68 that are received by a trip coil drive circuit 70 to activate a remote trip coil 72 to trip interlocked circuit breaker 21.

Each PEM also provides four discrete power supply voltages: Vee, 24V, Vdd, and 5V. Vee is generated by diode ORing −48 volt inputs A1 and A2, as depicted by diodes 70 and 72 in the Figure. Vee is used to reference the circuitry to the lowest potential as well as providing a source voltage for generating the other power supply voltages. The 24V power supply (not shown in FIG. 3), is generated by regulating the circuit GND down to 24VDC above the Vee potential level. The 24V power supply preferably comprises a linear supply used to energize the remote trip coil. Normally, the power supply does not provide any output power. However, if a failure of one of 48V services A1 or A2 is detected at system backplane 28, the 24V power supply provides 1A of output power to remote trip coil 68 long enough (e.g., <30 mS) to trip circuit breaker 21. Further details of the 24V power supply circuit are described below. Vdd is a reference voltage supply that is 5V below the GND potential (i.e., a −5V supply). The 5V power supply is a reference supply voltage that is 5V above the Vee potential.

Figure 4:
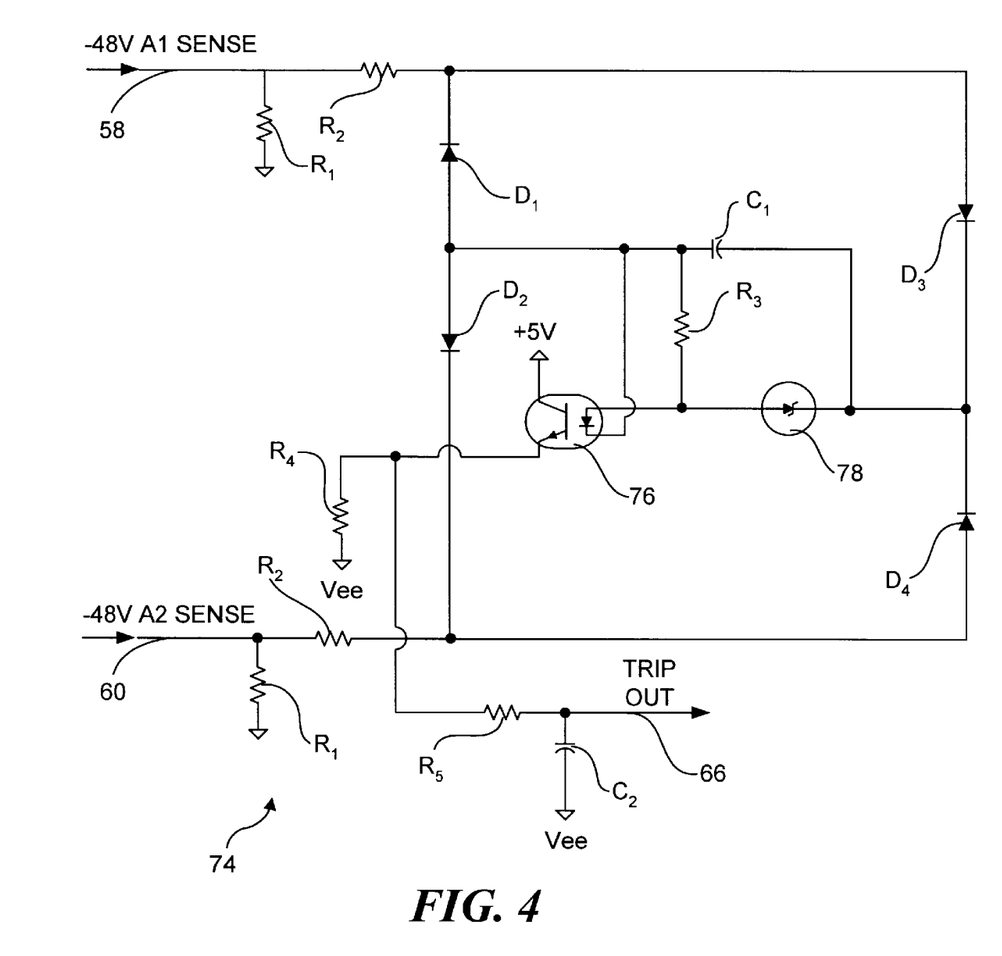
FIG. 4 is a schematic diagram illustrating a voltage differential detection circuit.

A schematic diagram of an exemplary circuit 74 corresponding to differential voltage detection circuit 54 is shown in FIG. 4. Circuit 74 receives 48V A1 sense signal 58 and −48V A2 sense signal 60 as inputs. Each of the input signals are tied to a common ground through a resistor $R_1$, and are connected in series with a resistor $R_2$. Preferably, $R_1$ comprises a pair of 2.2K ohm resistors in parallel, and $R_2$ comprises a pair of 470 ohm resistors in series. The inputs are connected to opposite sides of a bridge circuit comprising four diodes $D_1$, $D_2$, $D_3$, and $D_4$. The bridge circuit further includes an opto-isolator 76, a zener reference 78, a 1K resistor $R_2$, and a 1 uF capacitor $C_1$. Preferably, zener reference 78 comprises a Linear Technologies LT1431 programmable reference. The output of opto-isolator 76 is connected to output signal 66, which is coupled to Vee through a 10k resistor $R_4$, and includes a filter comprising a 10K resistor R5 connected in series and a 0.1 uF capacitor $C_2$ tied between output signal 66 and Vee.

Circuit 74 operates in the following manner. Zener reference 78 is set to a predetermined reference level that is a few volts below the desired voltage differential set point. For example, for a 26 volt differential set point, zener reference 78 should be set to 20.3 volts. If a difference between the voltage levels of the −48V A1 and A2 sense signals exceeds the predetermined reference level, opto-isolator 76 is activated, creating a drive current on output signal 66, which will activate trip coil 72 through the use of trip coil drive circuit 70, as explained below.

Figure 5:
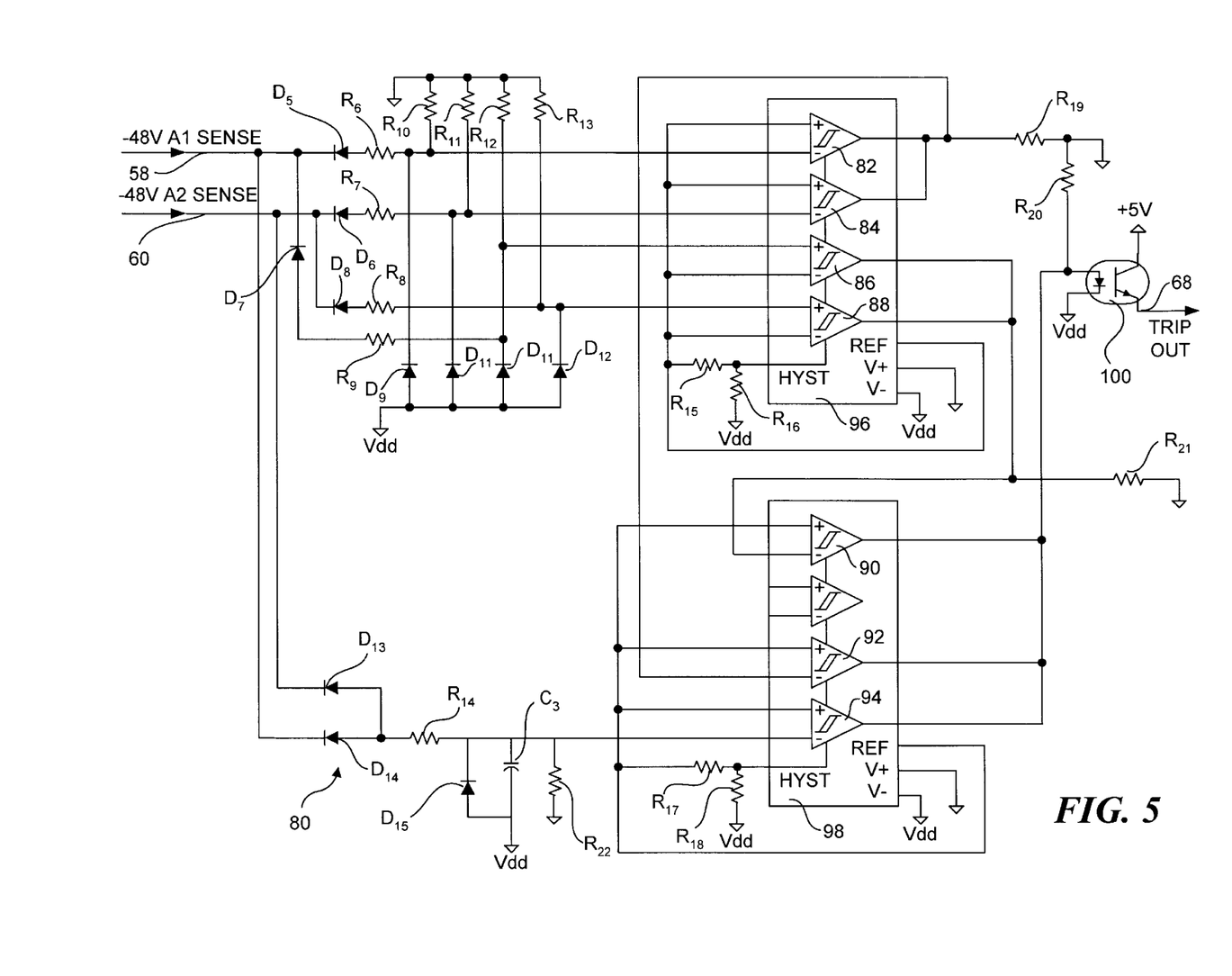
FIG. 5 is a schematic diagram illustrating an undervoltage detection circuit.

An exemplary circuit 80 for sensing under-voltage conditions and for preventing such conditions from being detected during normal power-up and power-down conditions in accord with under-voltage detection circuit 56 is shown in FIG. 5. The primary sensing elements of circuit 80 comprise a plurality of hysteresis-type comparators 82, 84, 86, 88, 90, 92, and 94, which are preferably provided by means of quad comparators 96 and 98. Each of quad comparators 96 and 98 include a reference voltage output that is preferably set at 1.22 volts (Vdd) (i.e., relative to Vdd, which is set at −5 volts nominally). The 1.22 (Vdd) reference voltage is received at the non-inverting inputs of comparators 82, 84, 90, 92, and 94, and the inverting inputs of comparators 86 and 88. Exemplary quad comparators that may be used in circuit 80 include an LTC1444 quad comparator manufactured by Linear Technologies.

Circuit 80 includes multiple diodes for signal conditioning purposes, including diodes $D_5$, $D_6$, $D_7$, $D_8$, $D_9$, $D_{10}$, $D_{11}$, $D_{12}$, $D_{13}$, $D_{14}$, and $D_{15}$, and further includes resistors $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, and $R_{22}$. Preferably, resistors $R_6$ and $R_7$ are 86.6 Kohm, resistors $R_8$, $R_.$, and $R_{14}$ are 90.9 Kohm, resistors $R_{10}$, $R_{11}$, $R_{12}$, $R_{13}$, $R_5$, $R_{17}$, $R_{19}$, $R_{21}$, and $R_{22}$ are 10 Kohm, resistors $R_{16}$ and $R_{18}$ are 2 Mohms, and resistor $R_{20}$ is 5 Kohm. As will be recognized by those skilled in the art, resistors $R_{10}$, $R_{11}$, $R_{12}$, and $R_{13}$ comprise a voltage divider network, while diodes $D_9$, $D_{10}$, $D_{11}$, and $D_{12}$ comprise a set of clamping diodes.

Circuit 80 operates in the following manner. Under normal operating conditions, i.e., when the voltage level −48V A1 and A2 sense signals is approximately −48V, the voltage appearing at the inverting terminals of comparators 82, 84, and 94 is approximately Vdd, or 0V (Vdd). Accordingly, the output of each of these comparators is set such that the output of an opto-isolator 100 is deactivated under normal conditions. In contrast, if either of −48V A1 and/or A2 sense signals falls below a threshold voltage level of approximately −36.5 V, the voltage level at the inverting terminals of comparators 82 and/or 84, as appropriate, will exceed the 1.22 V (Vdd) reference voltage, and the output of one or both of the comparators will be set such that the output of opto-isolator 100 is activated, thereby setting a trip condition on output signal 68.

It is desired to disable sensing of under-voltage condition during normal power-up and power-down operations. During power-up, the voltage senses on A1 and A2 will be less than the threshold voltage level, setting the outputs of comparators 82 and 84, which are commonly tied together. This would normally cause a trip condition. However, note that the inverting input of comparator 94 is is tied to Vdd through a 47 uF capacitor C3, and tied to ground through a 10K resistor R22, and the output of comparator 94 is tied to the control side of opto-isolator 100. As a result, when the PEM is powered up, capacitor C3 discharges for approximately six seconds, thereby preventing opto-isolator 100 from being activated. If only one of the PEM's −48V DC outputs is enabled during a power-up condition, this condition will be detected by differential detection circuit 54.

Circuit 80 also disables under-voltage sensing during power-down conditions. Normally, this will not be necessary, since a powering down a PEM will merely comprise opening a DC breaker, thereby shutting off input power to the PEM, which will immediately remove power received by logic cards 34 and 36. However, in the case of an AC source, a trip condition might occur upon shutdown. This condition is prevented by the combination of comparators 86, 88, and 90. Since resistors R8 and R9 have higher resistances than resistors R6 and R7 (90.9K vs. 85.6K), comparators 86 and 88 will detect an under-voltage conditions at a higher voltage level than comparators 82 and 84. The outputs of comparators 86 and 88 are commonly tied to the input of comparator 90, while the output of comparator 90 is tied to the control side of opto-isolator 100. As a result, during a power-down condition, the output of comparator 90 will be set so as to deactivate the undervoltage sensing provided by comparators 82 and 84.

Figure 6:
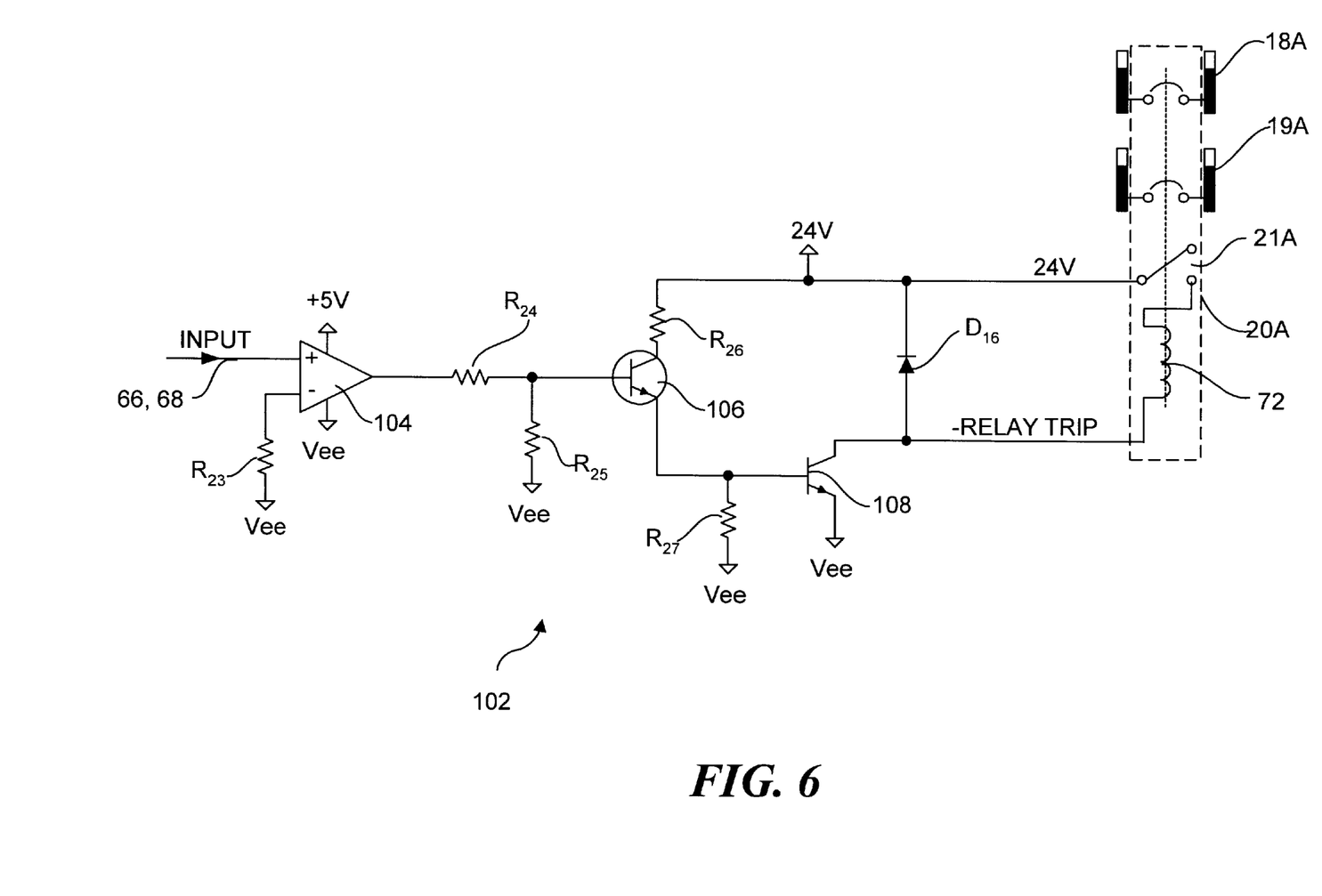
FIG. 6 is a schematic diagram illustrating a circuit for activating a remote trip coil for shutting down power to the system backplane.

An exemplary circuit 102 that may be implemented for trip coil drive circuit 70 is shown in FIG. 6. Circuit 102 comprises an operational amplifier (op amp) 104, transistors 106 and 108, and a diode $D_{15}$. The circuit additionally includes a plurality of resistors, including resistors $R_{23}$ (1 Kohm), $R_{24}$ (470 ohm), $R_{25}$ (10 K ohm), $R_{26}$ (940 ohm), and $R_{27}$ (10 Kohm).

Circuit 102 operates as follows. An input signal, corresponding to output signals 66 and 68 is received at the non-inverting input of op amp 104, while the inverting input of op amp 104 is tied to Vee through 1 K resistors $R_{23}$. Note that each of signals 66 and 68 is produced by respective opto-isolators 76 and 100. As a result, when the opto-isolators are deactivated (i.e., a non-trip condition), signals 66 and 68 comprise a high impedance, and the output of op amp 104 is set such that transistor 106 is not turned on. This will also shut off transistor 108, causing the low side of remote trip coil 72 to float, thereby disabling the remote trip coil. In contrast, if a trip condition appears on either or both of signals 66 and 68, op amp 104 produces an output that activates transistor 106, which then activates transistor 108, causing the low side of remote trip coil 72 to be connected to Vee, thereby producing a voltage differential across remote trip coil 72, which will activate the trip coil, causing interlocked circuit breaker 20A to be tripped. Upon being tripped, auxiliary switch 21A with be opened, thereby deactivating remote trip coil 72.

Numerous types of circuits commonly used to activate relay coils or other devices with similar loads may be used in place of circuit 102. For instance, remote trip coil 72 coil be activated by a relay circuit, or a power MOSFET or similar type of high-power solid-state switch.

In the foregoing specification, the invention has been described with reference to specific exemplary embodiments. It will, however, be evident that various modifications and changes may be made thereto without departing from the broader spirit and scope of the invention a set forth in the following claims. The specification and drawings are, accordingly, to be regarded in an illustrative rather than a restrictive sense.

What is claimed is:

1. A power supply system comprising:
   a first power entry module, including:
      a first power supply circuit; and
      a second power supply circuit; and
   a system backplane designed to receive a plurality of logic cards, said system backplane having a split power plane divided into a first and second section, said first section receiving power from the first power supply circuit and said second section receiving power from the second power supply circuit, said system backplane further including at least one logic plane that enables communication between said plurality of logic cards across the system backplane.

2. The power supply system of claim 1, wherein each of the first and second power supply circuits is enabled to receive input power from at least one DC power source via respective DC service points, each DC service point capable of providing a nominal voltage up to a predetermined current limit, said power supply system enabling approximately twice as much power to be supplied to the system backplane than would be available using a single DC service point.

3. The power supply system of claim 1, wherein the first power entry module includes a voltage differential circuit that disables power from being supplied to the system backplane if a voltage differential between voltage levels supplied by said first and second power supply circuits exceeds a predetermined threshold.

4. The power supply system of claim 1, wherein the first power entry module includes an under-voltage detection circuit to detect an under-voltage condition at the output of either or both of the first and second power supply circuits, said under-voltage detection circuit to remove power from the system backplane upon detection of the under-voltage condition.

5. The power supply system of claim 4, wherein the first power entry module further includes circuitry to prevent the under-voltage detection circuit from removing power to the system backplane during a start-up operation.

6. The power supply system of claim 4, wherein the first power entry module further includes circuitry to prevent the under-voltage detection circuit from removing power to the system backplane during a shut-down operation.

7. The power supply system of claim 1, further including a circuit breaker having a first and second pole connected respectively to the first and said second power supply circuits, said first and second poles being mechanically interlocked such that an activation of either the first or second pole of the circuit breaker in response to a detection of a current above a maximum threshold being supplied by either the first or second power supply circuits will automatically disable both the first and second power supply circuit from providing power to the system backplane.

8. The power supply system of claim 7, wherein one of the first and second poles includes a remote trip coil to enable the circuit breaker to be tripped in response to a remote trip condition signal.

9. The power supply system of claim 8, further comprising an auxiliary switch connected in series with the remote trip coil to deactivate the remote trip coil once the remote trip coil is tripped.

10. The power supply system of claim 1, further comprising:
    a second power entry module, including:
       a third power supply circuit enabled to supply power to the first section of the split power plane; and
       a fourth power supply circuit enabled to supply power to the second section of the split power plane,
    wherein the first and third power supply circuits comprise redundant power supply circuits that are connected such that power will be supplied to the first section of the split power plane as long as at least one of the first and third power supply circuits is operating normally, and wherein the second and fourth power supply circuits comprise redundant power supply circuits that are connected such that power will be supplied to the second section of the split power plane as long as at least one of the first and third power supply circuits is operating normally.

11. The power system of claim 10, wherein outputs of the first and third power supplies are diode ORed together, and outputs of the second and fourth power supplies are diode ORed together.

12. The power supply system of claim 10, wherein each of the first and second power supply circuits receive input power from a first power source, and each of the third and fourth power supply circuits receive input power from a second power source.

13. A power supply system, comprising:
    a first power entry module, including:
       a first power supply circuit; and
       a second power supply circuit;
    a second power entry module, including:
       a third power supply circuit; and
       a fourth power supply circuit;
    a system backplane to which a plurality of logic cards may be connected, said system backplane having a split power plane divided into a first and second section, said first section receiving power from the first and third power supply circuits and said second section receiving power from the second power supply circuit, said system backplane further including at least one logic plane to enable communication between said plurality of logic cards across the backplane.

14. The power supply system of claim 13, wherein outputs of each of the first and third power supply circuits comprise redundant power supply circuits that have outputs that are diode ORed together such that an adequate amount of power will be supplied to the first section of the split power plane as long as at least one of the first and third power supply circuits is operating normally, and wherein the second and fourth power supply circuits comprise redundant power supply circuits that have outputs that are diode ORed together such that an adequate amount of power will be supplied to the second section of the split power plane as long as at least one of the first and third power supply circuits is operating normally.

15. The power supply system of claim 13, wherein each of the first and second power entry modules include a voltage differential circuit that disables power from being supplied to the system backplane if a voltage differential between voltage levels supplied by the power supply circuits of each of the power entry modules exceeds a predetermined threshold.

16. The power supply system of claim 13, wherein each of the first and second power entry modules include an under-voltage detection circuit to detect an under-voltage condition at the output of either or both of the power supply circuits corresponding to that power entry module, said under-voltage detection circuits to remove power from the system backplane upon detection of the under-voltage condition.

17. The power supply system of claim 16, wherein each of the first and second power entry modules further include circuitry to prevent the under-voltage detection circuit from removing power from the system backplane during a start-up operation.

18. The power supply system of claim 16, wherein each of the first and second power entry modules further include circuitry to prevent the under-voltage detection circuit from removing power from the system backplane during a shut-down operation.

19. A method of supplying power to a plurality of logic cards, comprising:
providing a system backplane to which said plurality of logic cards are connected, said system backplane having a split power plane divided into a first and second section and including at least one logic plane that enables communication between said plurality of logic cards across the system backplane;
providing a first power entry module including a first and a second power supply circuit, said first power supply circuit providing power to the first section of the split power plane and said second power supply circuit providing power to said second section of the split power plane; and
removing power from the system backplane in response to detecting a failure condition.

20. The method of claim 19, further comprising:
determining if a difference between a voltage level supplied by the first power supply circuit and a voltage level supplied by the second power supply circuit exceeds a predetermined threshold; and
generating a failure condition in response thereto.

21. The method of claim 19, further comprising:
determining if a voltage level supplied by either of the first and second power supply circuits falls below a predetermined threshold; and
generating a failure condition in response thereto.

22. The method of claim 21, further comprising preventing the under-voltage failure condition from disabling power supply to the system backplane during a shut-down operation.

23. The method of claim 21, further comprising preventing the under-voltage failure condition from disabling power supply to the system backplane during a start-up operation.

24. The method of claim 19, further comprising:
providing a second power entry module including a third and a fourth power supply circuit, said third power supply circuit providing power to the first section of the split power plane and said fourth power supply circuit providing power to said second section of the split power plane;
connecting the first power supply circuit to the third power supply circuit so as to form a first set of redundant power supply circuits; and
connecting the second power supply circuit to the fourth power supply circuit so as to form a second set of redundant power supply circuits.

25. The method of claim 24, wherein the first power supply circuit is diode ORed to the third power supply circuit, and the second power supply circuit is diode ORed to the fourth power supply circuit.

26. The method of claim 19, further comprising:
providing at least one DC power source having at least two DC service points, each DC service point providing a nominal voltage up to a predetermined current limit;
supplying input power to the first power supply from one of said at least two DC service points; and
supplying input power to the second power supply from another of said at least two service points such that approximately twice as much power is supplied to the system backplane than would be available from a single service point.

27. A system for supplying power, comprising:
a first power entry module, including:
a first means for supplying power; and
a second means for supplying power; and
a system backplane to which a plurality of logic cards may be connected, said system backplane having a means for splitting power into a first and a second section, said first section receiving power from the first means for supplying power and said second section receiving power from the second means for supplying power, said system backplane further including at least one logic plane for enabling communication between said plurality of logic cards across the backplane.

28. The system for supplying power of claim 27, wherein the first power entry module includes a voltage differential detection means that disables power from being supplied to the system backplane if a voltage differential between voltage levels supplied by the first and second means for supplying power exceeds a predetermined threshold.

29. The system for supplying power of claim 27, wherein the first power entry module includes an under-voltage detection means for detecting an under-voltage condition at the output of either or both of the first and second means for supplying power, said under-voltage detection means removing power from the system backplane upon detection of the under-voltage condition.

30. The system for supplying power of claim 29, wherein the first power entry module further includes means for preventing the under-voltage detection means from removing power from the system backplane during a start-up operation.

31. The system for supplying power of claim 29, wherein the first power entry module further includes means for preventing the under-voltage detection means from removing power from the system backplane during a shut-down operation.

32. The system for supplying power of claim 27, further including a circuit breaking means having a first and second pole connected respectively to the first and said second means for supplying power, said first and second poles being coupled such that an activation of either the first or second pole of the circuit breaking means in response to a detection of excessive current being supplied by either the first or second means for supplying power will automatically disable both the first and second means for supplying power from providing power to the system backplane.

33. The system for supplying power of claim 32, wherein one of the first and second poles includes a remote trip means for enabling the circuit breaking means to be tripped in response to a means for indicating a remote trip condition.

34. The system for supplying power of claim 33, further comprising a means for deactivating the remote trip means once it has been tripped.

* * * * *